United States Patent [19]
Lin

[11] Patent Number: 6,068,398
[45] Date of Patent: May 30, 2000

[54] SAFETY PROTECTIVE HOOD ASSEMBLY FOR A FOOD BLENDER

[76] Inventor: Wen-Chih Lin, No. 8, Da-Guang St., Feng-Yuan City, Taiwan

[21] Appl. No.: 09/431,113

[22] Filed: Nov. 1, 1999

[51] Int. Cl.[7] ............... A23L 1/00; A21C 1/02; A21C 1/14; A23G 9/00; B01F 15/00
[52] U.S. Cl. ............... 366/347; 99/492; 99/645; 99/348; 366/197
[58] Field of Search ............... 99/337, 341, 348, 99/492, 645; 222/567, 570; 366/197–203, 129, 207, 204, 347; 426/519, 565, 569; D7/387, 391

[56] References Cited

U.S. PATENT DOCUMENTS

| | | | |
|---|---|---|---|
| 2,193,356 | 3/1940 | Green | 366/347 |
| 2,770,389 | 11/1956 | Drakoff | 99/645 X |
| 4,528,975 | 7/1985 | Wang | 99/645 X |
| 4,900,160 | 2/1990 | Brooks et al. | 366/347 |
| 5,207,506 | 5/1993 | Musseau et al. | 366/347 X |
| 5,306,083 | 4/1994 | Caldwell et al. | 99/348 X |
| 5,472,276 | 12/1995 | Ratermann et al. | 366/347 |
| 5,481,967 | 1/1996 | Chen | 99/645 X |
| 5,556,203 | 9/1996 | Filias | 366/129 X |
| 5,660,469 | 8/1997 | Seguin | 366/347 |
| 5,724,885 | 3/1998 | Uy | 99/341 |
| 5,766,665 | 6/1998 | Miller | 426/565 |
| 5,957,577 | 9/1999 | Dickson et al. | 366/197 |

*Primary Examiner*—Timothy Simone
*Attorney, Agent, or Firm*—Charles E. Baxley, Esq.

[57] ABSTRACT

A safety protective hood assembly for a food blender includes a fixed module including an annular supporting base having an underside defining an annular sliding groove, a slot defined in the supporting base, and a semi-conical fixed hood attached to the supporting base. A mobile module includes an annular sliding base slidably mounted in the sliding groove, a cavity defined in the sliding base, and a semi-conical movable hood attached to the sliding base to move therewith. When the movable hood is moved to a position where the movable hood and the fixed hood form a conical hood, the cavity aligns with the slot. A microswitch is attached to a supporting frame of the food blender and includes a retractable rod extending through the slot and the cavity when the cavity aligns with the slot.

8 Claims, 5 Drawing Sheets

6,068,398

SAFETY PROTECTIVE HOOD ASSEMBLY FOR A FOOD BLENDER

BACKGROUND OF THE INVENTION

1. Field of the Invention

The present invention relates to a safety protective hood assembly, and more particularly to a safety protective hood assembly for a food blender.

2. Description of the Related Prior Art

A conventional safety protective hood assembly for a food blender shown in FIG. 5 comprises a press ring 52, a bushing ring 53, a fixed ring 54, a connecting ring 55, a movable front protective net 51, a fixed rear protective cover 50, and a microswitch (not shown) each attached to the driving head 60 of the food blender. The front protective net 51 is opposed to the rear protective cover 50 to form an entire protective hood so as to prevent a user's fingers from contacting the rotating eccentric shaft (not shown) of the food blender. When the front protective net 51 is rotated relative to the rear protective cover 50 to open the protective hood, the operation of the food blender is stopped by the microswitch, thereby protecting the user's fingers from being injured by the rotating eccentric shaft of the food blender due to unintentionally opening the movable hood of the safety protective hood assembly.

However, the conventional safety protective hood assembly includes many components, thereby greatly complicating the assembly process and increasing the manufacturing cost of the safety protective hood assembly. In addition, the microswitch is fitted in the inside of the driving head 60 of the food blender so that it is difficult to assemble and dismantle the safety protective hood assembly.

SUMMARY OF THE INVENTION

The primary objective of the present invention is to provide a safety protective hood assembly for a food blender comprising a fixed module including an annular supporting base having an underside defining an annular sliding groove, a slot defined in the supporting base, and a semi-conical fixed hood attached to the supporting base.

The safety protective hood assembly also comprises a mobile module including an annular sliding base slidably mounted in the sliding groove, a cavity defined in the sliding base, and a semi-conical movable hood attached to the sliding base to move therewith. In such a manner, when the movable hood is moved to a position where the movable hood and the fixed hood form a conical hood, the cavity aligns with the slot.

The safety protective hood assembly also comprises a microswitch attached to a supporting frame of the food blender and including a retractable rod extending through the slot and the cavity when the cavity aligns with the slot.

Further objectives and advantages of the present invention will become apparent after a complete reading of the detailed description with reference to the accompanying drawings.

DETAILED DESCRIPTION OF THE PREFERRED EMBODIMENTS

Figure 1:
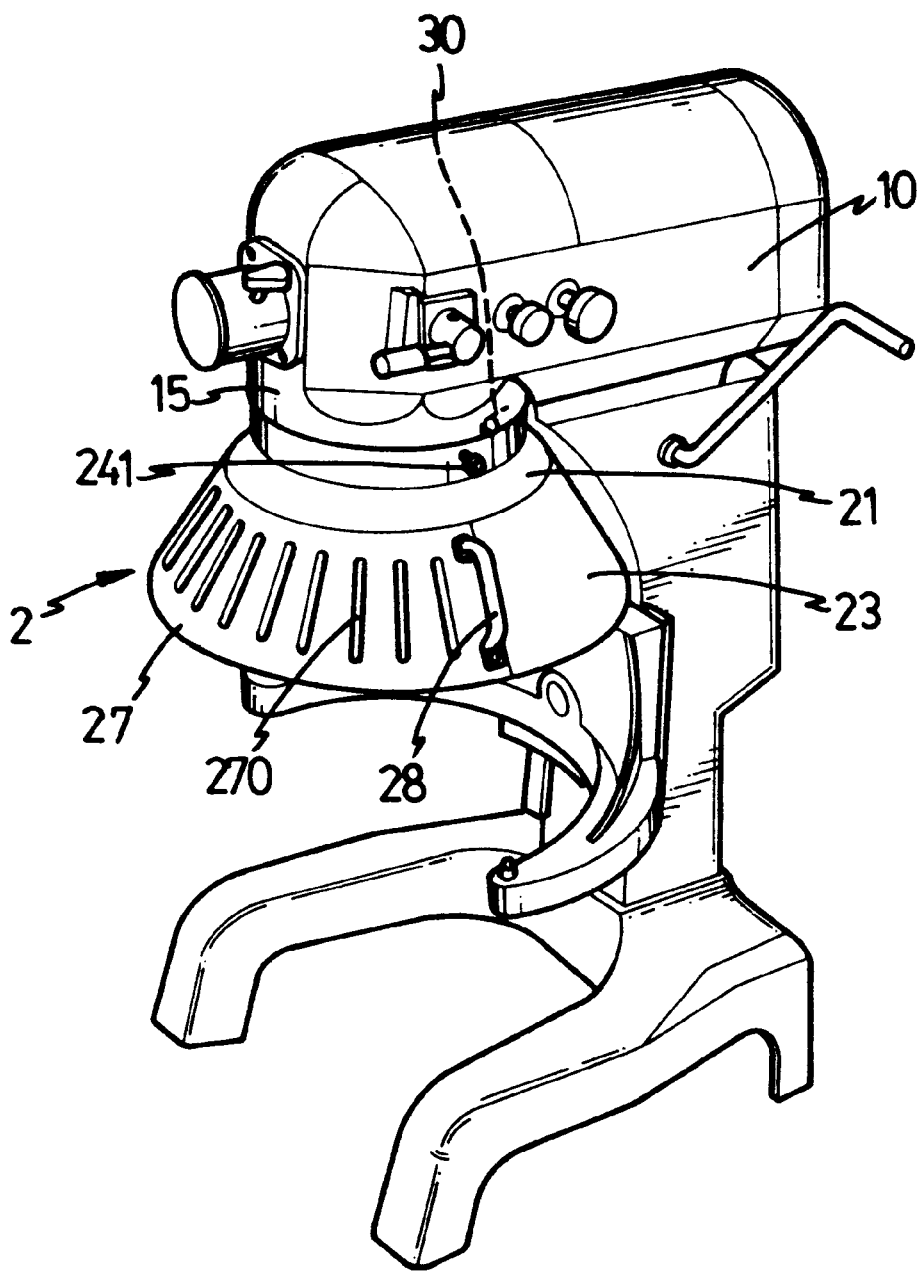
FIG. 1 is a perspective view of a safety protective hood assembly for a food blender according to the present invention.
Figure 2:
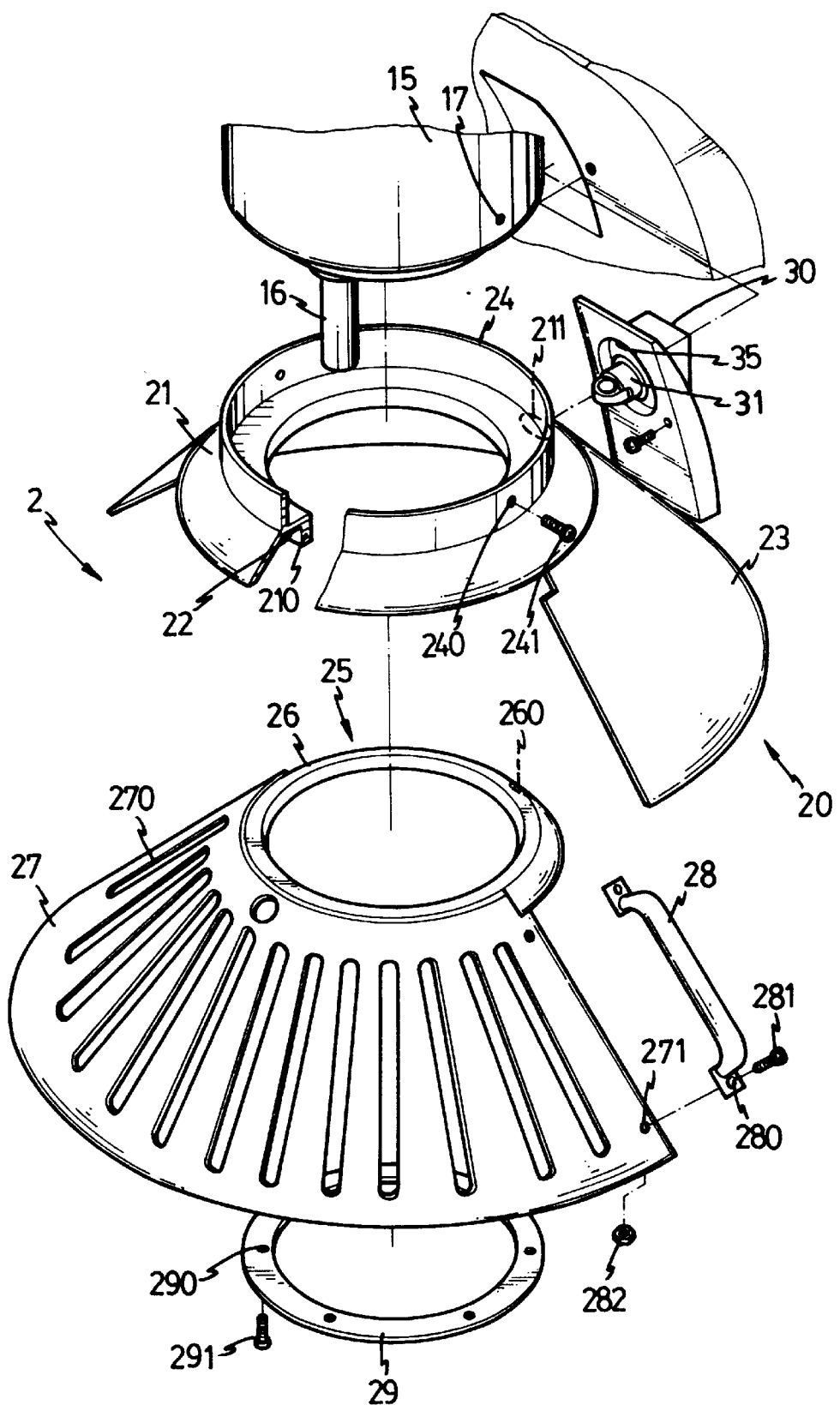
FIG. 2 is an exploded view of the safety protective hood assembly as shown in FIG. 1.
Figure 3:
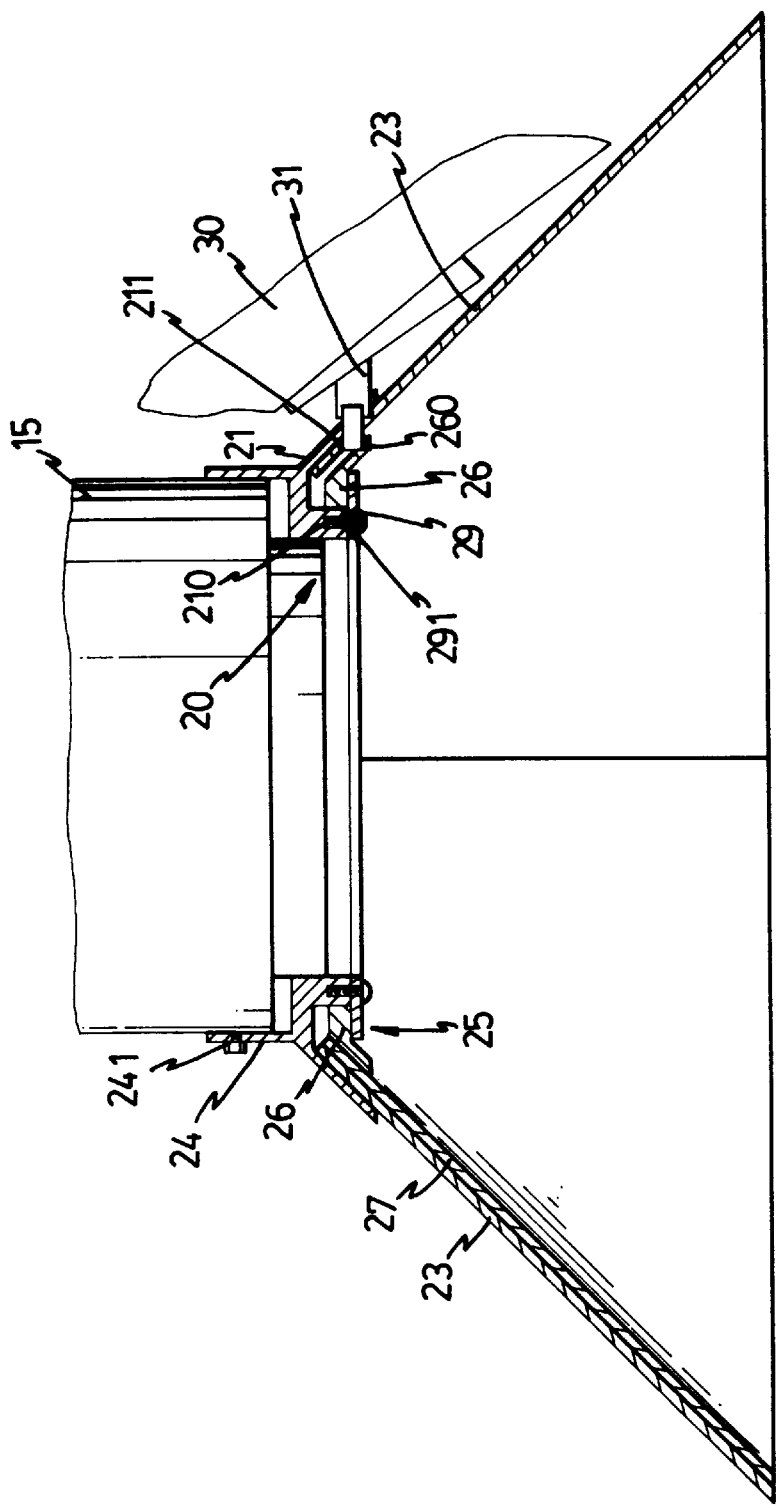
FIG. 3 is a side cross-sectional view of the safety protective hood assembly as shown in FIG. 1.

With reference to FIGS. 1–4, a safety protective hood assembly 2 for a food blender according to the present invention comprises a fixed module 20 including an annular supporting base 21 having an underside defining an annular sliding groove 22, a slot 211 defined in the supporting base 21, and a semi-conical fixed hood 23 attached to the supporting base 21. The supporting frame 10 of the food blender includes a head 15 extending downward and defining a plurality of threaded bores 17, and the fixed module 20 includes a positioning ring 24 extending upward from the fixed base 21 and defining a plurality of through holes 240, and a plurality of locking screws 241 each extending through a corresponding one of the through holes 240, and each screwed into a corresponding one of the threaded bores 17.

The safety protective hood assembly further comprises a mobile module 25 including an annular sliding base 26 slidably mounted in the sliding groove 22, a cavity 260 defined in the sliding base 26, and a semi-conical movable hood 27 attached to the sliding base 26 to move therewith, and having a periphery defining a plurality of elongated viewing slots 270.

Figure 4:
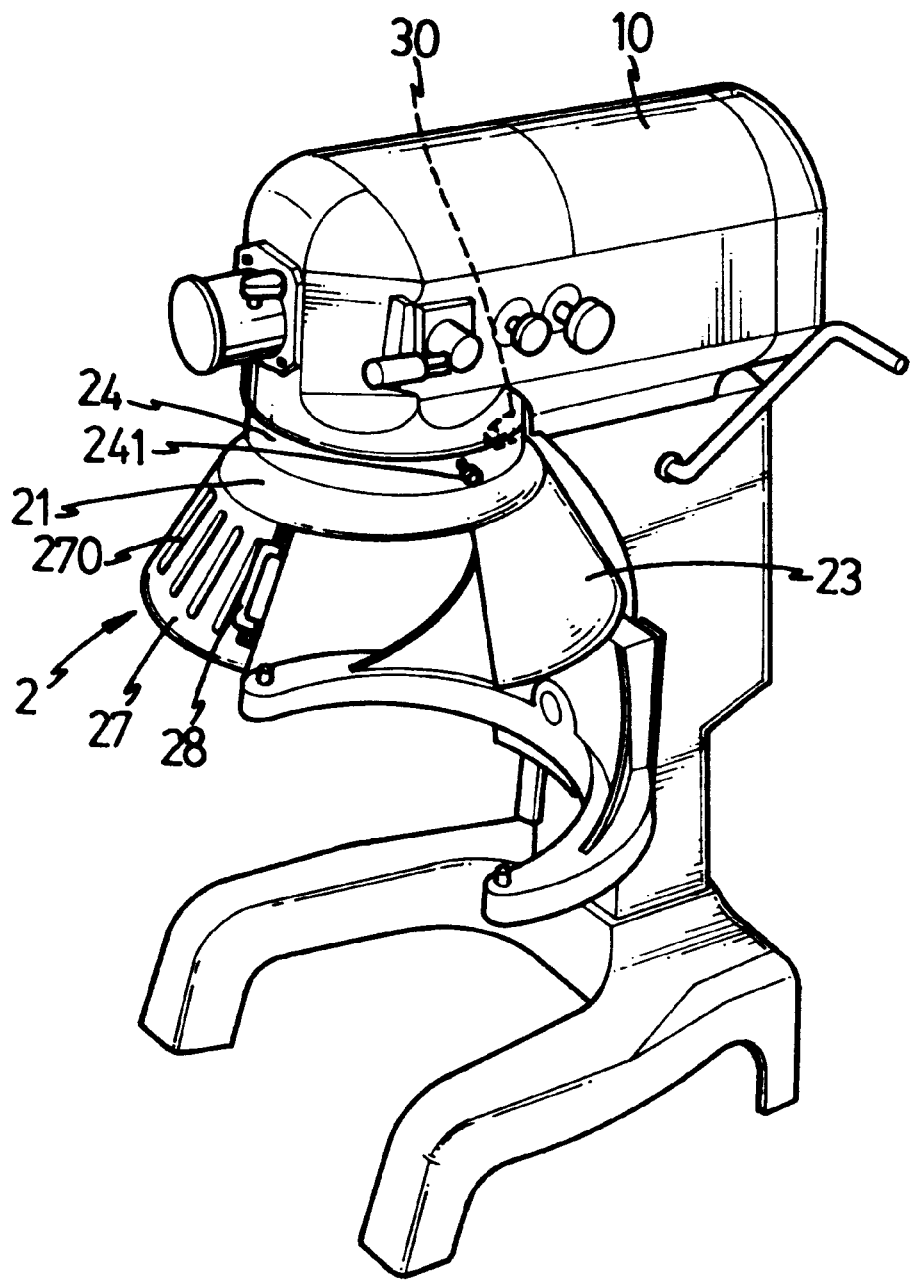
FIG. 4 is an operational view of the safety protective hood assembly as shown in FIG. 1.
Figure 5:
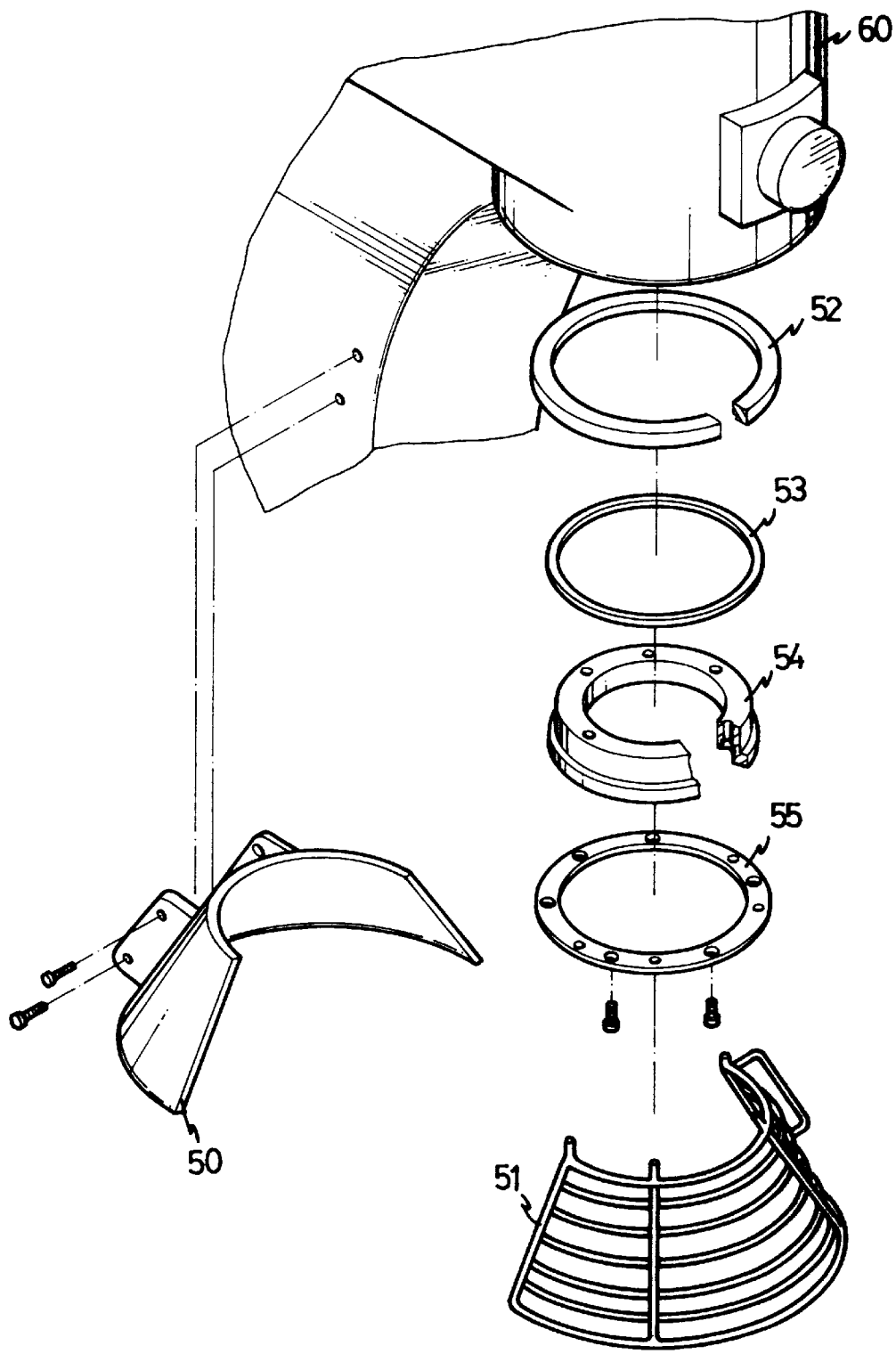
FIG. 5 is an exploded view of a conventional safety protective hood assembly for a food blender according to the prior art.

By such an arrangement, when the movable hood 27 is moved from the position as shown in FIG. 4 to the position as shown in FIG. 1 where the movable hood 27 and the fixed hood 23 form a conical hood, the cavity 260 aligns with the slot 211.

The movable hood 27 has two sides, and the mobile module 25 includes a handle 28 secured on one of the two sides of the movable hood 27. Each of the two sides of the movable hood 27 defines two through holes 271, the handle 28 has two ends each defining a through bore 280, and the mobile module 25 includes two locking bolts 281 each extending through the through bore 280 of a corresponding one of the two ends of the handle 28 and through a corresponding one of the two through holes 271 of the respective side of the movable hood 27, and two locking nuts 282 each engaged with a corresponding one of the two locking bolts 281.

The mobile module 25 includes a press ring 29 secured to the underside of the supporting base 21 and abutting the sliding base 26. The supporting base 21 has a plurality of threaded bores 210 defined in the underside thereof, the press ring 29 defines a plurality of through holes 290, and the mobile module 25 includes a plurality of locking screws 291 each extending through a corresponding one of the through holes 290, and each screwed into a corresponding one of the threaded bores 210.

The safety protective hood assembly further comprises a fixed board 35 secured to the supporting frame 10 of the food blender, and a microswitch 30 attached to the fixed board 35 of the supporting frame 10 of the food blender and including a retractable rod 31 in turn extending through the slot 211 and the cavity 260 when the cavity 260 aligns with the slot 211.

In operation, when the movable hood 27 is moved by moving the handle 28 from the position as shown in FIG. 4 to the position as shown in FIG. 1 where the movable hood 27 and the fixed hood 23 form a conical hood so that the cavity 260 aligns with the slot 211, the retractable rod 31 in turn extends through the slot 211 and the cavity 260 so that the microswitch 30 can operate for starting the normal operation of the food blender to rotate the eccentric shaft 16. The blending condition of food contained in the food blender can be seen from the viewing slots 270 of the movable hood 27.

When the movable hood 27 is moved by moving the handle 28 from the position as shown in FIG. 1 to the position as shown in FIG. 4, the retractable rod 31 is retracted into the slot 211 by the wall of the cavity 260 of the sliding base 26 to shut down the operation of the microswitch 30, thereby stopping the rotation of the eccentric shaft 16 of the food blender. In such a manner, the food blender normally operates only when the movable hood 27 entirely abuts the fixed hood 23, and the operation of the food blender is stopped when the movable hood 27 is moved relative to the fixed hood 23, so as to prevent a user's fingers from directly contacting the rotating eccentric shaft 16 of the food blender, thereby protecting the user's fingers from being injured by the rotating eccentric shaft 16 due to unintentionally opening the movable hood of the safety protective hood assembly 2.

By such an arrangement, the movable hood 27 is rotated relative to the fixed hood 23 and can be moved to be received into the fixed hood 23, thereby saving the space of the safety protective hood assembly 2.

Accordingly, the safety protective hood assembly 2 according to the present invention has the following advantages:

1. The safety protective hood assembly 2 is composed of the fixed module 20 and the mobile module, thereby greatly decreasing the components thereof.

2. The safety protective hood assembly 2 is easily assembled and dismantled, and the microswitch 30 is mounted to the supporting frame 10 of the food blender, thereby increasing the versatility thereof.

3. The safety protective hood assembly 2 consists of few components, and can be easily assembled, thereby decreasing the manufacturing cost thereof.

Although the present invention has been described with a certain degree of particularity, it is to be understood that the present disclose has been made by way of example only and that many other possible modifications and variations can be made without departing from the scope of the present invention.

What is claimed is:

1. A safety protective hood assembly for a food blender comprising:

a fixed module (20) including an annular supporting base (21) having an underside defining an annular sliding groove (22), a slot (211) defined in said supporting base (21), and a semi-conical fixed hood (23) attached to said supporting base (21);

a mobile module (25) including an annular sliding base (26) slidably mounted in said sliding groove (22), a cavity (260) defined in said sliding base (26), and a semi-conical movable hood (27) attached to said sliding base (26) to move therewith, wherein when said movable hood (27) is moved to a position where said movable hood (27) and said fixed hood (23) form a conical hood, said cavity (260) aligns with said slot (211); and a microswitch (30) attached to a supporting frame (10) of said food blender and including a retractable rod (31) extending through said slot (211) and said cavity (260) when said cavity (260) aligns with said slot (211).

2. The safety protective hood assembly as claimed in claim 1, wherein said supporting frame (10) of said food blender includes a head (15) extending downward and defining a plurality of threaded bores (17), and said fixed module (20) further includes a positioning ring (24) extending upward from said fixed base (21) and defining a plurality of through holes (240), and a plurality of locking screws (241) each extending through a corresponding one of said through holes (240), and each screwed into a corresponding one of said threaded bores (17).

3. The safety protective hood assembly as claimed in claim 1, wherein said movable hood (27) has two sides, and said mobile module (25) further includes a handle (28) secured on one of said two sides of said movable hood (27).

4. The safety protective hood assembly as claimed in claim 3, wherein each of said two sides of said movable hood (27) defines two through holes (271), said handle (28) has two ends each defining a through bore (280), and said mobile module (25) further includes two locking bolts (281) each extending through said through bore (280) of a corresponding one of said two ends of said handle (28) and through a corresponding one of said two through holes (271) of said respective side of said movable hood (27), and two locking nuts (282) each engaged with a corresponding one of said two locking bolts (281).

5. The safety protective hood assembly as claimed in claim 1, wherein said mobile module (25) further includes a press ring (29) secured to the underside of said supporting base (21) and abutting said sliding base (26).

6. The safety protective hood assembly as claimed in claim 5, wherein said supporting base (21) has a plurality of threaded bores (210) defined in the underside thereof, said press ring (29) defines a plurality of through holes (290), and said mobile module (25) further includes a plurality of locking screws (291) each extending through a corresponding one of said through holes (290), and each screwed into a corresponding one of said threaded bores (210).

7. The safety protective hood assembly as claimed in claim 1, wherein said movable hood (27) has a periphery defining a plurality of elongated slots (270).

8. The safety protective hood assembly as claimed in claim 1, further comprising a fixed board (35) secured to said supporting frame (10) of said food blender, wherein said microswitch (30) is attached to said fixed board (35).

* * * * *